United States Patent

[11] 3,561,530

| [72] | Inventors | William C. Tosch<br>Parker;<br>Stanley C. Jones, Littleton, Colo. |
|---|---|---|
| [21] | Appl. No. | 847,059 |
| [22] | Filed | Aug. 4, 1969 |
| [45] | Patented | Feb. 9, 1971 |
| [73] | Assignee | Marathon Oil Company<br>Findlay, Ohio<br>a corporation of Ohio |

[54] OIL RECOVERY METHOD USING MICELLAR SOLUTIONS
12 Claims, 1 Drawing Fig.

[52] U.S. Cl. ............................................. 166/252, 166/273
[51] Int. Cl. ............................................. E21b 43/22
[50] Field of Search ............................................. 166/273, 274, 275, 305, 252; 252/8.55D

[56] References Cited
UNITED STATES PATENTS

| 3,302,713 | 2/1967 | Ahearn et al. | 166/275X |
| 3,330,344 | 7/1967 | Reisberg | 166/275X |
| 3,348,611 | 10/1967 | Reisberg | 166/275 |
| 3,406,754 | 10/1968 | Gogarty | 166/273 |
| 3,455,389 | 7/1969 | Gogarty | 166/274 |
| 3,467,190 | 9/1969 | Dunlap et al. | 166/273X |
| 3,480,080 | 11/1969 | Murphy | 166/275X |
| 3,482,631 | 12/1969 | Jones | 166/273 |
| 3,493,047 | 2/1970 | Davis, Jr. et al. | 166/275X |
| 3,504,744 | 4/1970 | Davis, Jr. et al. | 166/275X |

*Primary Examiner*—Stephen J. Novosad
*Attorneys*—Joseph C. Herring, Richard C. Willard, Jr. and Jack L. Hummel

ABSTRACT: Hydrocarbon from a subterranean formation having an injection means in fluid communication with a production means is recovered by injecting and displacing through the formation a micellar solution having a mole ratio of aqueous medium to surfactant substantially at equilibrium with the formation water, the relationship taught by the curve in the attached figure. The micellar solution contains aqueous medium, hydrocarbon and surfactant and optionally cosurfactant (e.g. alcohol) and electrolyte. Compatibility between the formation fluids and injected micellar solution is obtained by determining the salinity of the formation water and selecting the desired mole ratio of aqueous medium to surfactant as illustrated in the figure to be used in the micellar solution.

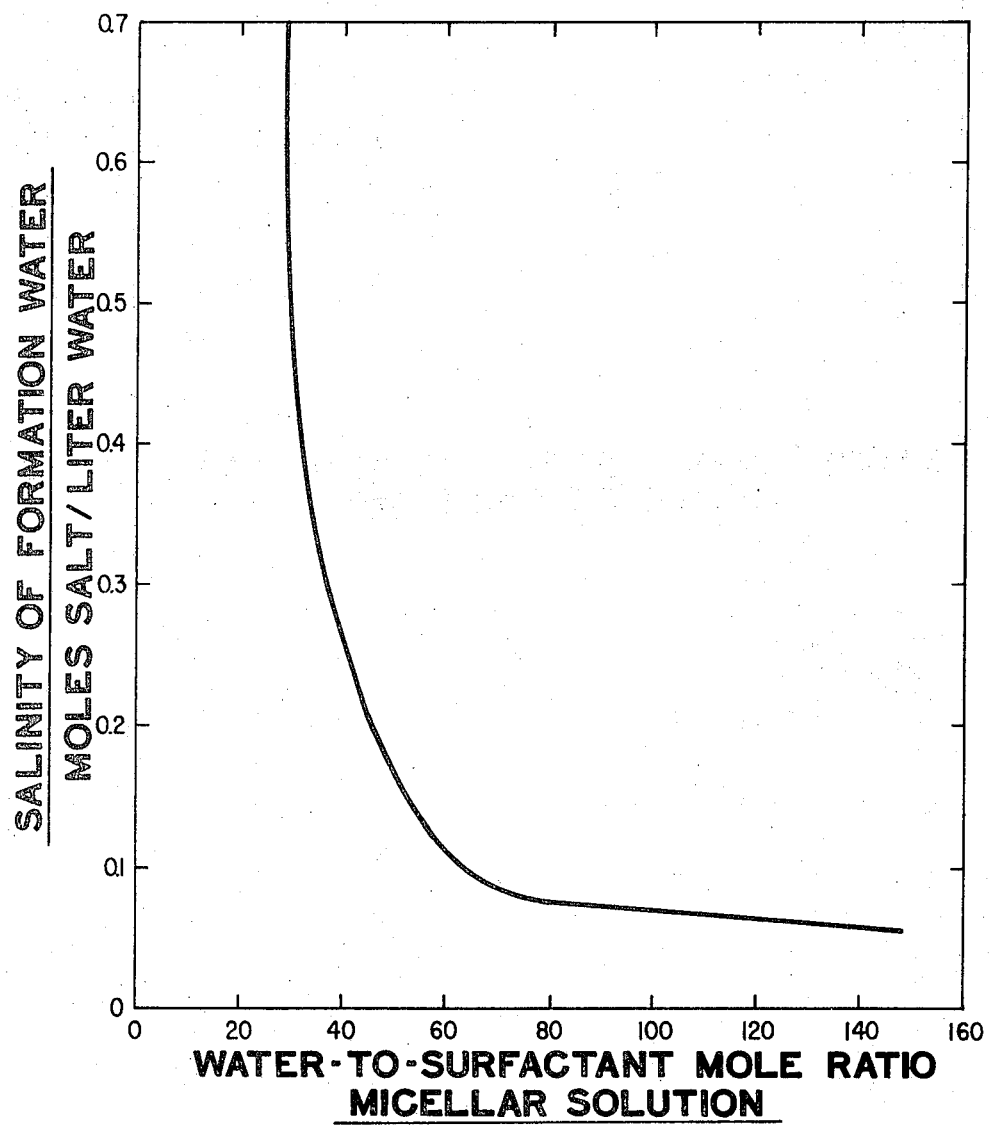

OIL RECOVERY METHOD USING MICELLAR SOLUTIONS

BACKGROUND OF THE INVENTION

This invention relates to secondary and tertiary recovery of hydrocarbon (e.g. crude oil) from a reservoir by displacement of formation fluids within the reservoir with a bank of micellar solution. This invention is particularly related to a method for designing the micellar solution to be compatible with formation fluids to maximize oil recovery The success of any displacement operation depends, inter alia, upon the compatibility of the displacing agent with the formation fluids (i.e. oil and water). That is, the displacing agent should not be adversely affected by the formation fluids to substantially degrade the characteristics of the agent, e.g. lower the viscosity of a micellar solution to cause unfavorable mobility control—the later can be effected by losing or "taking up" water soluble components in the micellar solution. It is recognized that improved recoveries are obtained when the ratio of mobilities ($M_R$) of the formation fluids ($M_F$) to the micellar solution ($M_S$) is approximately unity or greater than unity. The mobility ratio may be defined:

$$M_R = \frac{M_F}{M_S} = \left(\frac{K_o}{\mu_o} + \frac{K_w}{\mu_w}\right)\frac{\mu_s}{K_s}$$

wherein $K_o$, $K_w$ and $K_s$ are the effective permeabilities and $\mu_o$, $\mu_w$, and $\mu_s$ are the apparent viscosities of the formation oil, formation water (combination of oil and water defined as formation fluids) and the micellar solution.

U.S. Pat. Nos. 3,149,669, 3,163,214, 3,208,517, 3,254,714, and 3,406,754 teach the use of micellar systems in secondary and tertiary recovery of oil.

SUMMARY OF THE INVENTION

We have found that the compatibility of a micellar solution with formation fluids is dependent upon the mole ratio of water to surfactant in the solution and salinity of formation water with which the micellar solution will come into contact, and that the micellar solution may be designed to obtain desired compatibility by utilizing an equilibrium relationship between salinity of formation water and mole ratio of aqueous medium to surfactant, this relationship depicted in the FIGURE.

DESCRIPTION OF THE DRAWING

The FIGURE represents the equilibrium relationship between a micellar solution, obtained by diluting a stock solution containing 554 ml. of hydrocarbon (crude column overhead), 92 grams of surfactant (sodium petroleum sulfonate, average molecular and equivalent weights = 470, 62.4 percent active sulfonate) and 2—16 mls. of isopropanol with an aqueous medium of distilled water and sodium sulfate—the latter represented by the ordinate. The abscissa represents the equilibrium mole ratio of aqueous medium to sulfonate, at 72° F. The ordinate represents the salt concentration of the aqueous phase which is in equilibrium with the micellar solution, thus it also represents the salinity of formation fluids when designing a micellar solution for a particular oil-bearing formation.

DESCRIPTION OF THE INVENTION

The micellar solutions, also identified as micellar dispersions, microemulsions, etc. of the present invention can be oil-external or water-external. Micellar solutions differ from emulsions in many ways, one of the strongest differences being that the former are thermodynamically stable systems whereas the latter are not.

The micellar solution is composed essentially of hydrocarbon, aqueous medium (e.g. soft water, brackish water, or brine water), surfactant sufficient to impart desired solubilizing micellar characteristics to the dispersion, cosurfactant and/or electrolyte. In addition, the micellar solution can contain other agents compatible with it, e.g. corrosion inhibiting agent(s), bactericide(s), scale remover(s) etc.

Examples of useful components of the micellar dispersion are given in U.S. Pat. Nos. 3,254,714 to Gogarty et al., 3,266,570 to Gogarty, and 3,307,628 to Sena. Particularly preferred hydrocarbons include crude oil (both sweet and sour), partially refined fractions of crude oil and refined fractions of crude oil. Especially preferred surfactants include the alkyl aryl naphthenic sulfonates, also known as petroleum sulfonates, preferably containing a monovalent Examples of these surfactants are the sodium and ammonium petroleum sulfonates having an average equivalent weight of from about 350 to about 525 and more preferable from about 400 to about 470. By equivalent weight is meant the molecular weight divided by the number of sulfonate moieties per molecule, e.g. a monosulfonate having an average molecular weight of 470 also has an average equivalent weight of about 470. Mixtures of surfactants may be used. The most preferred cosurfactants include alcohols containing from about 3 to about 20 carbon atoms, e.g. isopropanol, isobutanol, n-amyl alcohol, decylalcohol, etc. Mixtures of cosurfactants are also useful.

The size of the micellar dispersion slug useful with this invention is from about 1 percent to about 20 percent pore volume. Larger pore volumes are useful but such may be economically unattractive. More preferably, volume amounts of from about 2 percent to about 10 percent formation pore volume are useful and give good results.

The slug of micellar dispersion may be followed directly be a drive fluid, e.g. water or gas, but more preferably is followed by a mobility buffer, preferably having a mobility about equal to or less than that of the micellar dispersion. The mobility buffer can have mobilities graded from a low of about that, or less, of the mobility of the micellar solution to a high (at its trailing edge) of about that of the drive fluid. (See U.S. Pat. No. 3,406,754 to Gogarty for further description).

The curved plotted in the FIGURE represents the equilibrium valves between an aqueous sodium sulfate (electrolyte) phase and a micellar solution containing crude column overhead as the hydrocarbon, a monosulfonated surfactant, and isopropyl alcohol as the cosurfactant. A change in any particular component of the slug will give a similar curve, but generally displaced either away from or toward one or both of the axes. Using a surfactant of lower equivalent weight will generally shift the equilibrium curve to the right, because of the relatively more hydrophilic nature of the surfactant. And, use of the higher equivalent weight cosurfactant, e.g. n-amyl alcohol, will generally shift the curve to the left, since these alcohols are more hydrophobic. A family of curves can be drawn for any given set of surfactants, cosurfactants, etc.

Given a curve of the type shown in the FIGURE and given a particular salinity of formation water (the ordinate), one can then choose a water-to-sulfonate ratio (abscissa) so that upon equilibrium between saline water and micellar solution, the final desired water-to-surfactant ratio will be obtained. The water-to-surfactant ratio will determine the desired compatibility of the micellar solution with the formation water. As an example, referring to the FIGURE if the salt concentration of the formation water is about 0.2, than 1 mole of sulfonate in the micellar solution will solubilize about 45 moles of water. If this mole ratio of 45:1 imparts the proper desired viscosity to the micellar solution slug, then such a slug will be very compatible with the recovery process. However, again assuming the salinity is 0.2, if the mole ratio of water-to-surfactant in the micellar solution is greater than 45, additional surfactant should be added to the slug to obtain the desired compatibility of the slug with the reservoir water. In this manner, the desired ratio of water to sulfonate may be obtained for a given salinity of formation water; and, providing the viscosity of the micellar solution is favorable to protect against fingering, an efficient flooding process can be obtained.

Note that if the formation water is relatively pure, i.e. very low salt concentrations, it is probable according to the figure that the micellar solution can contain very large amounts of water, e.g. up to 90 or 95 percent by volume. If the micellar solution itself contains dissolved salts in the aqueous medium, e.g. a brine solution, then this added salt content will influence the equilibrium curve for designing a compatible micellar solution slug.

The invention is not to be limited by the above description and examples. Rather, variations and modifications obvious to those skilled in the art are meant to be included within the scope of this invention as defined in the specification and appended claims.

We claim:

1. A process for recovery of fluids from a hydrocarbon-bearing subterranean formation penetrated by at least one producing means in fluid communication with at least one injecting means and containing formation water of a determinable salinity, comprising:
   a. injecting into the formation a micellar solution comprising hydrocarbon, aqueous medium, and surfactant, wherein for a given surfactant and salinity of formation water, the mole ratio of aqueous medium to surfactant in the micellar solution is selected by means of an equilibrium relationship of the kind depicted in the FIGURE between the salinity of formation water and said mole ratio to obtain a micellar solution compatible with the formation water,
   b. displacing the micellar solution through the formation and recovering hydrocarbon through the producing means.

2. The process of claim 1 wherein the micellar solution contains cosurfactant and/or electrolyte.

3. The process of claim 2 wherein the cosurfactant is alcohol containing an average of from about 3 to about 20 carbon atoms.

4. The process of claim 1 wherein the surfactant is petroleum sulfonate having an average equivalent weight within the range of from about 350 to about 525.

5. The process of claim 1 wherein the mole ratio of aqueous medium to surfactant is chosen so that the viscosity of the micellar solution will impart a mobility ratio of formation fluids to micellar solution of approximately unity or greater than unity.

6. The process of claim 1 wherein the micellar solution is displaced through the formation by drive fluid.

7. The process of claim 6 wherein a mobility buffer is injected into the formation prior to the drive fluid.

8. The process of claim 7 wherein the mobility buffer is characterized as having graded mobilities in at least a portion thereof ranging from front to rear of from about equal to or less than that of the micellar solution to about equal to or less than that of the drive fluid.

9. A process of designing a micellar solution comprised of hydrocarbon, aqueous medium, surfactant and optionally cosurfactant and/or electrolyte compatible with and useful in the recovery of hydrocarbon from a subterranean formation in fluid communication with at least one producing means and at least one injecting means and containing formation water of known salinity, comprising:
   a. determining the desired viscosity that the micellar solution should have for favorable mobility control to fluid flow within the formation;
   b. selecting a mole ratio of aqueous medium to a particular surfactant by means of an equilibrium relationship of the kind depicted in the FIGURE between salinity of the formation water and said ratio so that the resulting micellar solution is at equilibrium with the formation water and also has the desired viscosity; and
   c. displacing the micellar solution through the formation and recovering hydrocarbon through the production means.

10. The method of claim 9 wherein the surfactant is petroleum sulfonate having an average equivalent weight within the range of from about 350 to about 525.

11. The method of claim 9 wherein the cosurfactant is alcohol containing an average of from about 3 to about 20 carbon atoms.

12. The method of claim 9 wherein the mole ratio of aqueous medium to surfactant is chosen so that the viscosity of the micellar solution will determine a mobility ration of displaced formation fluids to micellar solution of approximately unity or about greater than unity.